United States Patent
Yu et al.

(10) Patent No.: US 12,520,278 B2
(45) Date of Patent: Jan. 6, 2026

(54) METHOD AND APPARATUS FOR RESOURCE ALLOCATION IN V2X COMMUNICATION

(71) Applicant: LENOVO (BEIJING) LIMITED, Beijing (CN)

(72) Inventors: Xiaodong Yu, Beijing (CN); Haipeng Lei, Beijing (CN); Zhennian Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 859 days.

(21) Appl. No.: 17/627,354

(22) PCT Filed: Jul. 16, 2019

(86) PCT No.: PCT/CN2019/096176
§ 371 (c)(1),
(2) Date: Jan. 14, 2022

(87) PCT Pub. No.: WO2021/007778
PCT Pub. Date: Jan. 21, 2021

(65) Prior Publication Data
US 2022/0322296 A1 Oct. 6, 2022

(51) Int. Cl.
*H04W 72/02* (2009.01)
*H04L 5/00* (2006.01)
(Continued)

(52) U.S. Cl.
CPC .......... *H04W 72/02* (2013.01); *H04L 5/0053* (2013.01); *H04W 72/044* (2013.01); *H04W 72/23* (2023.01)

(58) Field of Classification Search
CPC ... H04W 72/02; H04W 72/044; H04W 72/23; H04W 4/40; H04L 5/0053; H04L 1/1861; H04L 1/1893; H04L 1/1896
See application file for complete search history.

(56) References Cited

U.S. PATENT DOCUMENTS 12,096,427 B2 * 9/2024 Lu .................. H04W 88/08
2018/0255532 A1 * 9/2018 Li .................. H04W 88/04
(Continued)

FOREIGN PATENT DOCUMENTS

CN 107637000 A 1/2018
EP 3979731 B1 * 6/2024 ............... H04L 1/18
(Continued)

OTHER PUBLICATIONS

International Searching Authority, "Written Opinion of the International Searching Authority," PCT/CN2019/096176, Apr. 10, 2020, pp. 1-4.
(Continued)

*Primary Examiner* — Mounir Moutaouakil
(74) *Attorney, Agent, or Firm* — Kunzler Bean & Adamson

(57) ABSTRACT

Embodiments of the present disclosure relate to methods and apparatuses for resource allocation in vehicle to everything (V2X) communication. According to an embodiment of the present disclosure, a method may include: determining resource allocation information indicating at least one set of resources for a set of transport blocks; and transmitting the determined resource allocation information. Each set of resources is associated with a transport block of the set of transport blocks to be transmitted on sidelink. Each set of resources may include: a plurality of sidelink transmission resources, each sidelink transmission resource being configured to carry a sidelink transmission of the transport block; a plurality of sidelink feedback resources, each sidelink feedback resource being configured to carry sidelink feedback information in response to the sidelink transmission of the transport block; and a plurality of uplink feedback resources, at least one of the plurality of uplink feedback resources being configured to carry uplink feed- (Continued)

back information in response to the sidelink transmission of the transport block only in the case that the sidelink feedback information represents that the transport block has been successfully decoded.

20 Claims, 9 Drawing Sheets

(51) Int. Cl.
*H04W 72/044* (2023.01)
*H04W 72/23* (2023.01)

(56) References Cited

U.S. PATENT DOCUMENTS

| | | | | |
|---|---|---|---|---|
| 2019/0110325 A1* | 4/2019 | Gulati | | H04L 5/0053 |
| 2019/0124634 A1* | 4/2019 | Li | | H04L 5/14 |
| 2019/0281526 A1* | 9/2019 | Freda | | H04W 36/03 |
| 2019/0393992 A1* | 12/2019 | Xiong | | H04L 1/1812 |
| 2021/0345378 A1* | 11/2021 | Lu | | H04L 1/189 |
| 2023/0136864 A1* | 5/2023 | Lei | | H04L 5/0055 370/329 |
| 2023/0328784 A1* | 10/2023 | Lei | | H04W 72/25 370/329 |

FOREIGN PATENT DOCUMENTS

| | | |
|---|---|---|
| WO | 20160763001 A1 | 5/2016 |
| WO | 2018145296 A1 | 8/2018 |

OTHER PUBLICATIONS

VIVO, Physical layer procedure for NR sidelink, 3GPP TSG RAN WG1 Meeting #96bis, R2-1904077, Apr. 8-12, 2019, pp. 1-11, Xi'an, China.

* cited by examiner

METHOD AND APPARATUS FOR RESOURCE ALLOCATION IN V2X COMMUNICATION

TECHNICAL FIELD

Embodiments of the present disclosure are related to wireless communication technology, and more particularly, related to methods and apparatuses for resource allocation in a new radio (NR) supporting V2X communication.

BACKGROUND

In a wireless communication system, a user equipment (UE), e.g. mobile device, may communicate with another UE via a data path supported by an operator's network, e.g. a cellular or a Wi-Fi network infrastructure. The data path supported by the operator's network may include a base station (BS) and multiple gateways.

In the case that both UEs are relatively close to each other, a radio link or a sidelink (SL) can be established between both UEs to provide Device-to-Device (D2D) communication and without going through a direct link to the BS. The term "SL" may refer to a direct radio link established for communicating among devices, e.g. UEs, as opposed to communicating via the cellular infrastructure (uplink and downlink) as discussed above. In this case, the "SL" is also being referred to as a D2D communication link. The D2D communication link may be used in any suitable telecommunication network in accordance with various standards, where the telecommunication network may configure a resource pool to be used by UEs during such D2D communication.

D2D communication may provide various advantages, for example, a relatively high transfer rate, a relatively low delay, etc. Moreover, during the D2D communication, traffic concentrated at a base station can be distributed. Furthermore, a UE supporting D2D communication, e.g. D2D UE, may function as a relay node to extend coverage of a base station that the UE is in communication with.

D2D communication has evolved into a vehicle-to-everything (V2X) communication in the Long Term Evolution (LTE) SL standard. The V2X communication technology encompasses communication involving vehicles as message sources or destinations. In an NR communication system, both a unicast and a groupcast communication have been introduced as part of the V2X communication standard, so as to further improve the transmission efficiency on the SL between, for example, UEs. During the unicast communication, data on the SL is only sent in one direction to a specific V2X UE and cannot be decoded by other UEs. In the groupcast communication, data on the SL is sent to a group of V2X UEs and can be decoded by each receiving UE within the group.

At present, NR V2X communication supports two resource allocation modes: 1) mode 1: the base station (e.g. gNB) indicates SL resource(s) to the transmitting (Tx) UE for SL communication; and 2) mode 2: the Tx UE selects SL resource(s) for SL communication from a resource pool which contains SL resources configured by the base station.

How to allocate resources to the Tx UE is an important subject for NR V2X communication technology, which should reduce transmission delay and resource waste.

SUMMARY OF THE DISCLOSURE

One object of embodiments of the present disclosure is to provide an improved technical solution for resource allocation in an NR V2X communication.

According to an embodiment of the present disclosure, a method may include: determining resource allocation information indicating at least one set of resources; and transmitting the determined resource allocation information. Each set of resources is associated with a transport block of a set of transport blocks to be transmitted on SL. Each set of resources may include: a plurality of SL transmission resources, each SL transmission resource being configured to carry an SL transmission of the transport block; a plurality of SL feedback resources, each SL feedback resource being configured to carry SL feedback information in response to the SL transmission of the transport block; and a plurality of uplink feedback resources, at least one of the plurality of uplink feedback resources being configured to carry uplink feedback information in response to the SL transmission of the transport block only in the case that the SL feedback information represents that the transport block has been successfully decoded.

According to another embodiment of the present disclosure, a method may include: receiving resource allocation information indicating at least one set of resources; and transmitting transport blocks based on the resource allocation information. Each set of resources is associated with a transport block of a set of transport blocks to be transmitted on SL. Each set of resources may include: a plurality of SL transmission resources, each SL transmission resource being configured to carry an SL transmission of the transport block; a plurality of SL feedback resources, each SL feedback resource being configured to carry SL feedback information in response to the SL transmission of the transport block; and a plurality of uplink feedback resources, at least one of the plurality of uplink feedback resources being configured to carry uplink feedback information in response to the SL transmission of the transport block only in the case that the SL feedback information represents that the transport block has been successfully decoded.

According to yet another embodiment of the present disclosure, an apparatus includes: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present disclosure with the at least one receiver, the at least one transmitter and the at least one processor.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the NR V2X mode 1 configuration, a base station (BS), for example a gNB, indicates an SL and an uplink (UL) resources to a Tx UE. The SL and the UL resources specified by the base station may mainly include communication resources to support transmission of a transport block(s) (TB(s)) on the SL, an SL feedback resource(s) to support transmission of a feedback information on the SL and a UL feedback resource(s) to support transmission of a feedback information on the UL. The TB is a block of data or a packet of data to be transmitted, for example, by the Tx UE to a Receiving (Rx) UE. Transmission of the feedback information on the SL or the UL is associated with the transmission or retransmission of the TB on the SL and may include feedback information representing whether the TB has been successfully decoded by the corresponding Rx UE. For example, the feedback information may be an acknowledgement (ACK) feedback representing that the TB has been successfully decoded, or a non-acknowledgement (NACK) feedback representing that the TB has not been successfully decoded.

The base station may transmit resource allocation information to indicate the SL and UL resources to the Tx UE. Specific resource allocation information will be different dependent on different resource allocation schemes, which will be illustrated in the following text in view of different embodiments of the present disclosure.

For example, in an allocation scheme referred to as "dynamic scheduling," for each SL transmission (either an initial transmission or retransmission) of a TB, the base station will perform one resource allocation to schedule or indicate the SL transmission resource, SL feedback resource in response to the SL transmission, and UL feedback resource in response to the SL transmission. That is, the indicated SL and UL resources for the TB only include the SL transmission resource, SL feedback resource, and UL feedback resource for one complete transmission of the TB (i.e., SL transmission and its associated sidelink and uplink feedback information transmissions to the Tx UE and the base station respectively).

Figure 1:
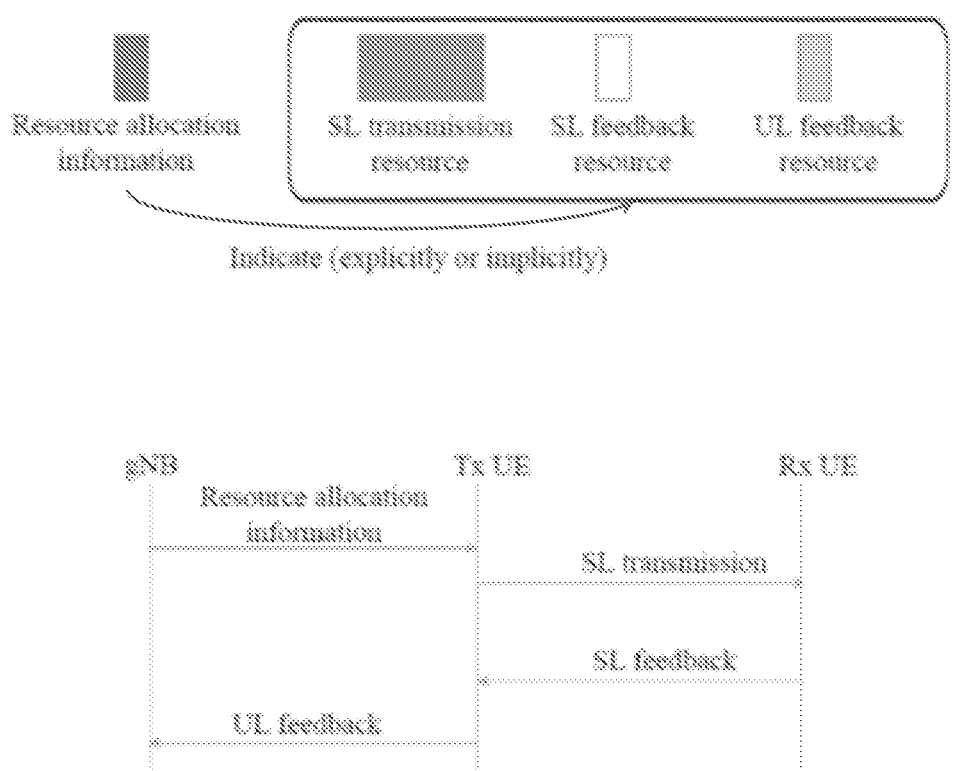
FIG. 1 is a schematic diagram illustrating a scheme of dynamic scheduling.

FIG. 1 is a schematic diagram illustrating a scheme of dynamic scheduling.

As shown in FIG. 1, the base station (e.g., gNB) may transmit a piece of resource allocation information to the Tx UE. In some embodiments of the present disclosure, the resource allocation information may be carried by physical layer downlink control information (DCI). In other embodiments of the present disclosure, the resource allocation information may be carried by higher-layer signalling from the base station, for example, radio resource control (RRC) signalling. The resource allocation information indicates a set of resources for a TB, to the Tx UE. The TB is a block of data or packet of data to be transmitted, for example by the Tx UE. The set of resources may include one SL transmission resource, one SL feedback resource, and one UL feedback resource.

The SL transmission resource is configured to carry an SL transmission of the TB. The SL feedback resource is configured to carry SL feedback information in response to the SL transmission of the TB. According to an embodiment of the present disclosure, the SL feedback resource may be explicitly indicated in the resource allocation information, for example by indicating the location of the SL feedback resource in the time domain. According to another embodiment of the present disclosure, the SL feedback resource may be implicitly indicated. For example, although the location of the SL feedback resource in the time domain is not explicitly indicated in the resource allocation information, an association (e.g., relative location) between the SL transmission resource and its associated SL feedback resource in the time domain is predefined by the base station or based on the resource pool configuration.

The UL feedback resource is configured to carry UL feedback information in response to the SL transmission of the TB. According to an embodiment of the present disclosure, the UL feedback resource may be explicitly indicated in the resource allocation information, for example by indicating the location of the UL feedback resource in the time domain. According to another embodiment of the present disclosure, the UL feedback resource may be implicitly indicated. For example, although the location of the UL feedback resource in the time domain is not explicitly indicated in the resource allocation information, an association (e.g., relative location) between the SL transmission resource and its associated UL feedback resource or an association (e.g., relative location) between the SL feedback resource and its associated UL feedback resource in the time domain is predefined by the base station or based on the resource pool configuration.

As shown in FIG. 1, after receiving the resource allocation information from the base station, the Tx UE may transmit the TB based on the resource allocation information. According to an embodiment of the present disclosure, the Tx UE may transmit the TB to a receiving (Rx) UE on the SL transmission resource indicated by the resource allocation information. Then the Rx UE may transmit SL feedback information on the SL feedback resource indicated (explicitly or implicitly) by the resource allocation information or by the Tx UE, based on the decoding state of the TB. For example, in the case that the Rx UE has successfully decoded the TB, it may transmit an ACK feedback to the Tx UE on the indicated SL feedback resource. In the case that the Rx UE did not successfully decode the TB, it may transmit an NACK feedback to the Tx UE on the indicated SL feedback resource. The ACK feedback and the NACK feedback may be transmit on an SL feedback channel, for example, physical sidelink feedback channel (PSFCH). In an embodiment of the present disclosure, the SL feedback information from the Rx UE may use one bit with a value "1" or "0" to represent that the TB has been successfully decoded or not respectively. For example, the value "1" may represent the ACK feedback in response to the SL transmission of the TB, and value "0" may represent the NACK feedback in response to the SL transmission of the TB. Alternatively, the value "0" may represent the ACK feedback in response to the SL transmission of the TB, and the value "1" may represent the NACK feedback in response to the SL transmission of the TB.

For the TB transmitted on the SL transmission resource, the Tx UE may monitor the associated SL feedback resource indicated (explicitly or implicitly) by the resource allocation information to detect the SL feedback information in response to the SL transmission of the TB. The Tx UE may transmit the corresponding UL feedback information to the base station based on the detected SL feedback information on the UL feedback resource indicated (explicitly or implicitly) by the resource allocation information. According to an embodiment, in the case that the Tx UE detects an ACK feedback on the indicated SL feedback resource, it may transmit an ACK feedback to the base station on the indicated UL feedback resource. In the case that the Tx UE detects an NACK feedback on the indicated SL feedback resource, it may transmit an NACK feedback to the base station on the indicated UL feedback resource. In an embodiment, the UL feedback information may use one bit with a value "0" or "1." For example, the value "1" may represent the ACK feedback in response to the SL transmission of the TB, and value "0" may represent the NACK feedback in response to the SL transmission of the TB. Alternatively, the value "0" may represent the ACK feedback in response to the SL transmission of the TB, and the value "1" may represent the NACK feedback in response to the SL transmission of the TB.

According to an embodiment, in response to an NACK feedback in response to the SL transmission of the TB being detected on the indicated UL feedback resource, the base station may indicate another set of resources for retransmission of the TB and its associated SL and UL feedback information. However, for an ACK feedback in response to the SL transmission of the TB being detected on the indicated UL feedback resource, the base station will determine that the SL transmission of the TB is successful and no retransmission of this TB is needed.

Although only one Rx UE is shown in FIG. 1, those having ordinary skills in the art would appreciate that the scheme can be applied in a groupcast communication where there may be more than one Rx UE. Similarly, the schemes described below can also be applied in a groupcast communication.

According to the scheme illustrated in FIG. 1, if the SL transmission of the TB fails (i.e., the TB cannot be successfully decoded by the Rx UE), the Tx UE will detect an NACK feedback on the SL feedback resource. In that case, the Tx UE needs to transmit an NACK feedback on the UL feedback resource. The Tx UE has to wait for another piece of resource allocation information indicating a set of resources for retransmission of the TB. Similarly, the set of resources may include an SL transmission resource for retransmission, and its associated SL and UL feedback resources. Apparently, the scheme of "dynamic scheduling" illustrated in FIG. 1 may result in a time delay in the case that a retransmission is needed, which is an important issue especially for delay sensitive V2X services.

Figure 2:
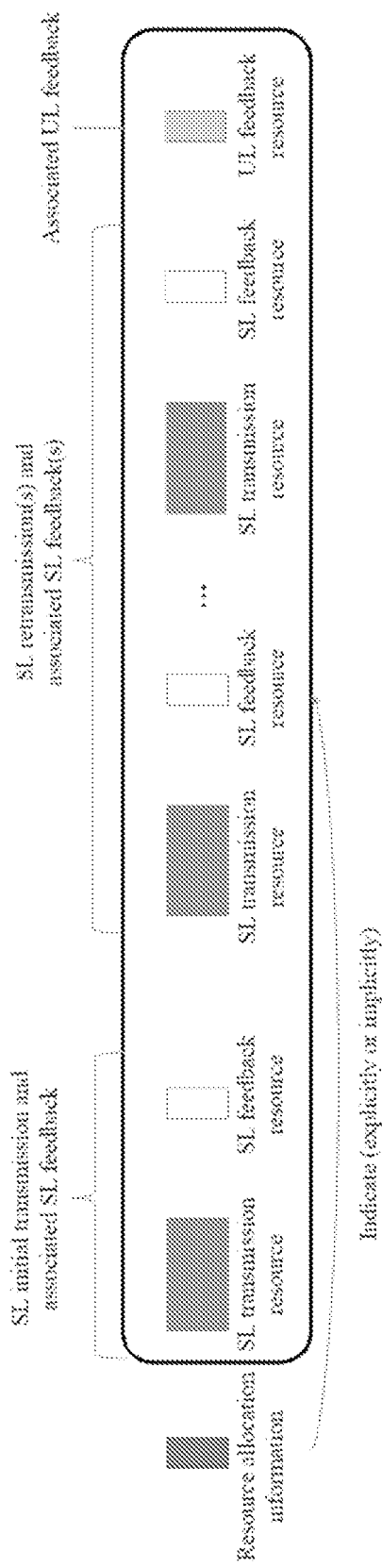
FIG. 2 is a schematic diagram illustrating another resource allocation scheme.

FIG. 2 is a schematic diagram illustrating another resource allocation scheme. In this scheme, the base station may schedule a set of resources for one initial SL transmission, one or more SL retransmissions, one or more SL feedback information transmissions associated with the SL transmission and SL retransmission(s), and one UL feedback information transmission for a TB.

As shown in FIG. 2, the base station (e.g., gNB) may transmit a piece of resource allocation information to the Tx UE. In some embodiments of the present disclosure, the resource allocation information may be carried by physical layer DCI. In other embodiments of the present disclosure, the resource allocation information may be carried by higher-layer signalling from the base station, for example, RRC signalling. The resource allocation information indicates a set of resources for a TB, to the Tx UE. The TB is a block of data or packet of data to be transmitted, for example by the Tx UE. The set of resources may include a plurality of SL transmission resources and respective associated SL feedback resources, and one UL feedback resource, wherein the plurality of SL transmission resources may include one SL initial transmission resource and one or more SL retransmission resources.

Each of the plurality SL transmission resources is configured to carry an SL transmission of the TB, which may be an SL initial transmission or an SL retransmission. The SL initial transmission resource is configured to carry the SL initial transmission, and the SL retransmission resource is configured to carry the SL retransmission.

Each of the SL feedback resources is associated with a corresponding SL transmission of the TB. The SL feedback resource is configured to carry SL feedback information in response to the corresponding SL transmission of the TB. According to an embodiment of the present disclosure, the SL feedback resource may be explicitly indicated in the resource allocation information, for example by indicating the location of the SL feedback resource in the time domain. According to another embodiment of the present disclosure, the SL feedback resource may be implicitly indicated. For example, although the location of the SL feedback resource in the time domain is not explicitly indicated in the resource allocation information, an association (e.g., relative location) between the SL transmission resource and its associated SL feedback resource in the time domain is predefined by the base station or based on the resource pool configuration.

The UL feedback resource is configured to carry UL feedback information in response to the SL transmission of the TB. According to an embodiment of the present disclosure, the UL feedback resource may be explicitly indicated in the resource allocation information, for example by indicating the location of the UL feedback resource in the time domain. According to another embodiment of the present disclosure, the UL feedback resource may be implicitly indicated. For example, although the location of the UL feedback resource in the time domain is not explicitly indicated in the resource allocation information, an association (e.g., relative location) between the SL initial transmission resource and the UL feedback resource in the time domain is predefined by the base station or based on the resource pool configuration. Those having ordinary skills in the art would appreciate that the UL feedback resource may be implicitly indicated in other manners.

According to the scheme illustrated in FIG. 2, after receiving the resource allocation information from the base station, the Tx UE may transmit the TB based on the resource allocation information. According to an embodiment of the present disclosure, the Tx UE may transmit the TB to an Rx UE on the SL initial transmission resource indicated by the resource allocation information. Then the Rx UE may transmit SL feedback information on the associated SL feedback resource indicated (explicitly or implicitly) by the resource allocation information or by the Tx UE, based on the decoding state of the TB. For example, in the case that the Rx UE has successfully decoded the TB, it may transmit an ACK feedback to the Tx UE on the indicated SL feedback resource. In the case that the Rx UE did not successfully decode the TB, it may transmit an NACK feedback to the Tx UE on the indicated SL feedback resource. The ACK feedback and the NACK feedback may be transmit on an SL feedback channel, for example, PSFCH. In an embodiment of the present disclosure, the SL feedback information from the Rx UE may use one bit with a value "1" or "0" to represent that the TB has been successfully decoded or not respectively. For example, the value "1" may represent the ACK feedback in response to the SL transmission of the TB, and value "0" may represent the NACK feedback in response to the SL transmission of the TB. Alternatively, the value "0" may represent the ACK feedback in response to the SL transmission of the TB, and the value "1" may represent the NACK feedback in response to the SL transmission of the TB.

For the TB transmitted on the SL transmission resource, the Tx UE may monitor the associated SL feedback resource indicated (explicitly or implicitly) by the resource allocation information to detect the SL feedback information in response to the SL transmission of the TB. According to an embodiment of the present disclosure, in the case that the Tx UE detects an NACK feedback on the associated SL feedback resource, it may retransmit the TB on the subsequent SL transmission resource(s) indicated by the resource allocation information, until it detects an ACK feedback on an SL feedback resource or all the SL transmission resources indicated by the resource allocation information have been used. In the case that the Tx UE detects an ACK feedback on an SL feedback resource, it will determine that the SL transmission of the TB is successful and no retransmission of this TB is needed. That is, the Tx UE will not use the remaining SL transmission resource(s) and associated SL feedback resource(s) indicated for the TB.

The Tx UE can transmit the feedback information, e.g., an ACK or NACK feedback to the base station on the UL feedback resource indicated (explicitly or implicitly) by the resource allocation information. In the case that the Tx UE detects an NACK feedback on all the SL feedback resources indicated by the resource allocation information, it may transmit an NACK feedback to the base station on the indicated UL feedback resource. In an embodiment, the UL feedback information may use one bit with a value "0" or "1." For example, the value "1" may represent the ACK feedback in response to the SL transmission of the TB, and value "0" may represent the NACK feedback in response to the SL transmission of the TB. Alternatively, the value "0" may represent the ACK feedback in response to the SL transmission of the TB, and the value "1" may represent the NACK feedback in response to the SL transmission of the TB.

According to an embodiment, in response to an NACK feedback in response to the SL transmission of the TB being detected on the indicated UL feedback resource, the base station may indicate another set of resources for retransmission of the TB and its associated SL and UL feedback information. In response to an ACK feedback in response to the SL transmission of the TB detected on the indicated UL feedback resource, the base station will determine that the SL transmission of the TB is successful and no retransmission of this TB is needed.

However, since only one UL feedback resource is configured for all the SL transmissions, it must be after all indicated SL transmission resources and SL feedback resources in the time domain. The Tx UE can only transmit the feedback information, e.g., an ACK or NACK feedback to the base station on the single UL feedback resource. Accordingly, if the TB has been successfully decoded by the Rx UE before the last SL transmission resource indicated by the resource allocation information, the base station cannot reallocate these resources for transmission of another TB due to not receiving the ACK feedback timely. Accordingly, the remaining SL transmission resource(s) and associated SL feedback resource(s) indicated for the TB will be wasted.

Figure 3:
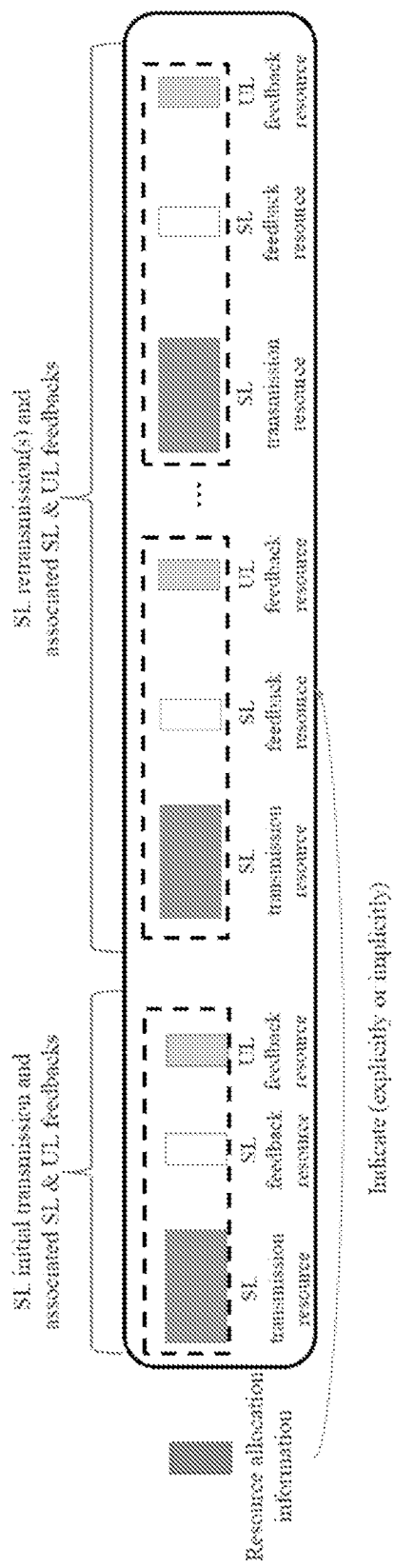
FIG. 3 is a schematic diagram illustrating yet another resource allocation scheme.

FIG. 3 is a schematic diagram illustrating yet another resource allocation scheme. In this scheme, the base station may schedule a set of resources for one initial SL transmission, one or more SL retransmissions, one or more SL feedback information transmissions associated with the SL transmission and SL retransmission(s), and more than one UL feedback information transmissions for a TB.

As shown in FIG. 3, the base station (e.g., gNB) may transmit a piece of resource allocation information to the Tx UE. In some embodiments of the present disclosure, the resource allocation information may be carried by physical layer DCI. In other embodiments of the present disclosure, the resource allocation information may be carried by higher-layer signalling from the base station, for example, RRC signalling. The resource allocation information indicates a set of resources for the TB, to the Tx UE. The set of resources may include a plurality of subsets of resources (each subset is surrounded by a dashed box in FIG. 3). Each subset of resources may include one SL transmission resource, one associated SL feedback resource, and one associated UL feedback resource. The first subset of resources among the plurality of subsets of resources may be configured for the SL initial transmission of the TB, and the other subset(s) of resources may be configured for the SL retransmission of the TB.

The SL transmission resource in each subset of resources indicated by the resource allocation information is configured to carry an SL transmission (SL initial transmission or an SL retransmission) of the TB.

The SL feedback resource in each subset of resources is configured to carry SL feedback information in response to the associated SL transmission of the TB. According to an embodiment of the present disclosure, the SL feedback resource may be explicitly indicated in the resource allocation information, for example by indicating the location of the SL feedback resource in the time domain. According to another embodiment of the present disclosure, the SL feedback resource may be implicitly indicated. For example, although the location of the SL feedback resource in the time domain is not explicitly indicated in the resource allocation information, an association (e.g., relative location) between the SL transmission resource and its associated SL feedback resource in the time domain is predefined by the base station or based on the resource pool configuration.

The UL feedback resource in each subset of resources is configured to carry UL feedback information in response to the associated SL transmission of the TB. According to an embodiment of the present disclosure, the UL feedback resource may be explicitly indicated in the resource allocation information, for example by indicating the location of the UL feedback resource in the time domain. According to another embodiment of the present disclosure, the UL feedback resource may be implicitly indicated. For example, although the location of the UL feedback resource in the time domain is not explicitly indicated in the resource allocation information, an association (e.g., relative location) between the SL transmission resource and its associated UL feedback resource or an association (e.g., relative location) between the SL feedback resource and its associated UL feedback resource in the time domain is predefined by the base station or based on the resource pool configuration. Those having ordinary skills in the art would appreciate that the UL feedback resource may be implicitly indicated in other manners.

According to the scheme illustrated in FIG. 3, after receiving the resource allocation information from the base station, the Tx UE may transmit the TB based on the resource allocation information. According to an embodiment of the present disclosure, the Tx UE may transmit the TB to an Rx UE on the SL transmission resource of the first subset of resources indicated by the resource allocation information. Then the Rx UE may transmit SL feedback information on the associated SL feedback resource indicated (explicitly or implicitly) by the resource allocation information or by the Tx UE, based on the decoding state of the TB. For example, in the case that the Rx UE has successfully decoded the TB, it may transmit an ACK feedback to the Tx UE on the associated SL feedback resource. In the case that the Rx UE did not successfully decode the TB, it may transmit an NACK feedback to the Tx UE on the associated SL feedback resource. The ACK feedback and the NACK feedback may be transmit on an SL feedback channel, for example, PSFCH. In an embodiment of the present disclosure, the SL feedback information from the Rx UE may use one bit with a value "1" or "0" to represent that the TB has been successfully decoded or not respectively. For example, the value "1" may represent the ACK feedback in response to the SL transmission of the TB, and value "0" may represent the NACK feedback in response to the SL transmission of the TB. Alternatively, the value "0" may represent the ACK feedback in response to the SL transmission of the TB, and the value "1" may represent the NACK feedback in response to the SL transmission of the TB.

For the TB transmitted on the SL transmission resource, the Tx UE may monitor the associated SL feedback resource indicated (explicitly or implicitly) by the resource allocation information to detect the SL feedback information in response to the SL transmission of the TB. The Tx UE may transmit the corresponding UL feedback information to the base station based on the detected SL feedback information on the associated UL feedback resource indicated (explicitly or implicitly) by the resource allocation information.

According to an embodiment, in the case that the Tx UE detects an NACK feedback on the associated SL feedback resource, it may transmit an NACK feedback to the base station on the associated UL feedback resource, and then retransmit the TB on the SL transmission resource(s) of the subsequent subset(s) of resources indicated by the resource allocation information, until it detects an ACK feedback on an SL feedback resource or all the SL transmission resources indicated by the resource allocation information have been used.

In the case that the Tx UE detects an ACK feedback on the associated SL feedback resource, it may transmit an ACK feedback to the base station on the associated UL feedback resource indicated (explicitly or implicitly) by the resource allocation information. The Tx UE will determine that the SL transmission of the TB is successful and no retransmission of this TB is needed. Accordingly, the Tx UE will not use the remaining SL transmission resource(s) and associated SL and UL feedback resource(s) indicated for the TB.

In an embodiment, the UL feedback information may use one bit with a value "1" or "0." For example, the value "1" may represent the ACK feedback in response to the SL transmission of the TB, and value "0" may represent the NACK feedback in response to the SL transmission of the TB. Alternatively, the value "0" may represent the ACK feedback in response to the SL transmission of the TB, and the value "1" may represent the NACK feedback in response to the SL transmission of the TB.

According to an embodiment, in response to an ACK feedback in response to the SL transmission of the TB being detected on a UL feedback resource, the base station may determine that the SL transmission of the TB is successful and no retransmission of this TB is needed. Accordingly, the base station can release the unused SL transmission resource(s) and SL and UL feedback resource(s) in the indicated set of resources such that they can be allocated for another TB. In response to an NACK feedback in response to the SL transmission of the TB being detected on a UL feedback resource, the base station needs to do nothing with respect to resource allocation for the TB unless the UL feedback resource is the last UL feedback resource in the indicated set of resources, i.e., all the SL transmission resources indicated by the resource allocation information have been used. In response to an NACK feedback in response to the SL transmission of the TB being detected on the last UL feedback resource in the indicated set of resources, the base station may indicate another set of resources for retransmission of the TB and its associated SL and UL feedback information.

In FIG. 3, the number of the SL transmission resources, the number of the SL feedback resources, and the number of the UL feedback resources indicated in the resource allocation information are the same. According to an alternative embodiment of the present disclosure, the number of the SL transmission resources, the number of the SL feedback resources, and the number of the UL feedback resources indicated in the resource allocation information may be different from one another. For example, the resource allocation information may indicate M SL transmission resources, N SL feedback resources, and Q UL feedback resources for the TB, wherein M, N, and Q are integers, and $M \geq N \geq Q \geq 1$. That is, the resource allocation information may schedule M times of SL transmissions for the TB, schedule N times of SL feedback transmissions for the M times of SL transmissions, and schedule Q times of UL feedback transmissions for the N times of SL feedback transmissions (i.e., every i times of SL transmissions may have one SL feedback, every j times of SL transmissions may have one UL feedback, and every k times of SL feedbacks may have one UL feedback, wherein i=roundup (M/N), j=roundup (M/Q), k=roundup (N/Q), and the function "roundup (x)" means rounding up x to a nearest integer). The values of i, j, k, M, N, and Q may be determined based on reliability or delay requirement of the traffic.

According to the scheme illustrated in FIG. 3, if the Tx UE detects an NACK feedback for the TB on an SL feedback resource but there still exist one or more unused SL transmission resources in the indicated set of resources that can be used for retransmission of the TB, the Tx UE does not need the base station to indicate another set of resources for retransmission of the TB. In this case, from a system prospective, the NACK feedback on the UL feedback resource is a useless feedback.

Figure 4:
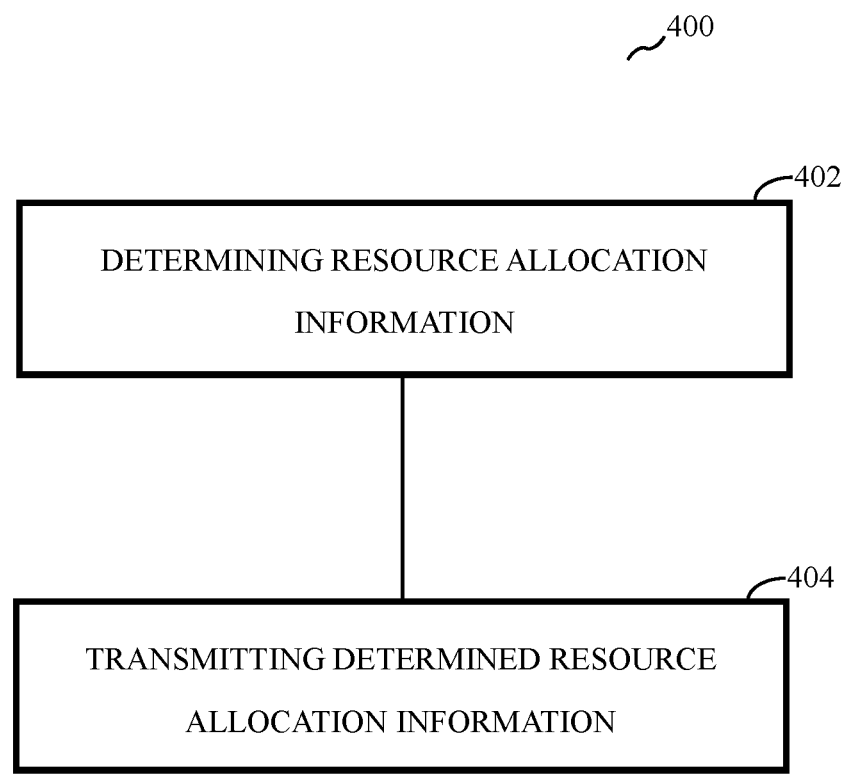
FIG. 4 illustrates a flow chart of a method for resource allocation according to an embodiment of the present disclosure.

FIG. 4 illustrates a flow chart of a method 400 for resource allocation according to an embodiment of the present disclosure. Although described with respect to a base station, it should be understood that other devices may be configured to perform a method similar to that of FIG. 4.

As shown in FIG. 4, in step 402, a base station may determine resource allocation information indicating at least one set of resources. Each set of resources is associated with a TB of a set of TBs to be transmitted on SL. Each set of resources may include: a plurality of SL transmission resources, each SL transmission resource being configured to carry an SL transmission of the TB; a plurality of SL feedback resources, each SL feedback resource being configured to carry SL feedback information in response to the SL transmission of the TB; and a plurality of UL feedback resources, at least one of the plurality of UL feedback resources being configured to carry UL feedback information in response to the SL transmission of the TB only in the case that the SL feedback information represents that the TB has been successfully decoded. The resource allocation information may indicate one set of resources for one TB to be transmitted on SL. Alternatively, the resource allocation information may indicate a plurality of sets of resources for the set of TBs to be transmitted on SL in some other embodiments of the present disclosure.

The base station will transmit the determined resource allocation information, e.g., to a Tx UE in step 404, so that the Tx UE can transmit the set of TBs.

In some embodiments of the present disclosure, the base station may receive, from the Tx UE, ACK information confirming receipt of the resource allocation information. Accordingly, the base station can determine that the resource allocation information has been successfully received by the Tx UE, and a retransmission of the resource allocation information is not needed.

Figure 5:
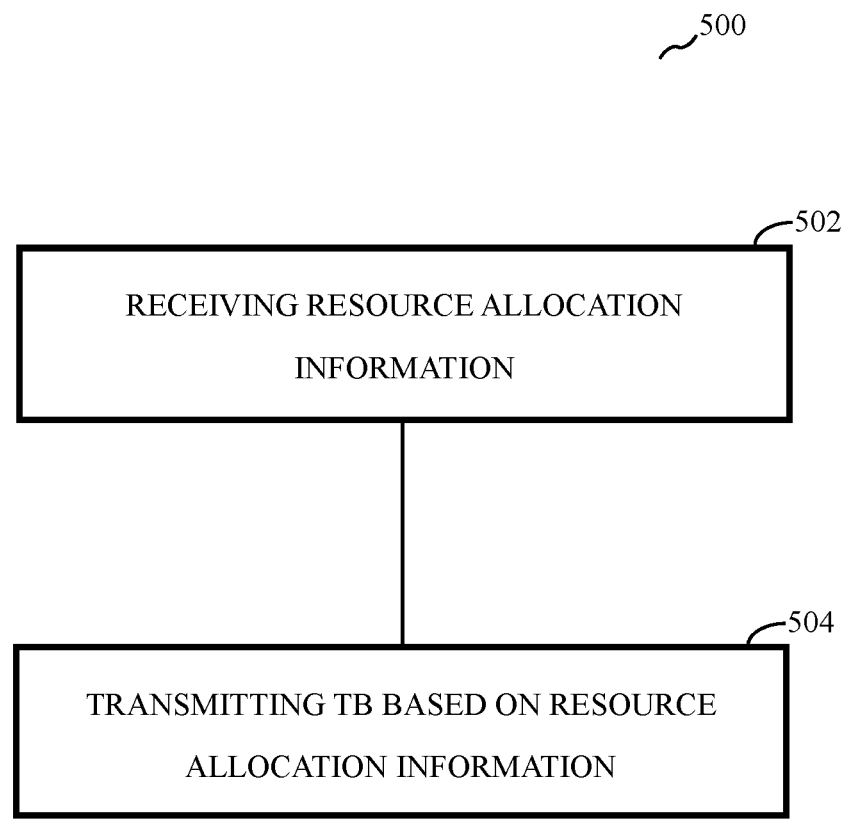
FIG. 5 illustrates a flow chart of a method for resource allocation according to another embodiment of the present disclosure.

FIG. 5 illustrates a flow chart of a method 500 for resource allocation according to another embodiment of the present disclosure. Although described with respect to a Tx UE, it should be understood that other devices may be configured to perform a method similar to that of FIG. 5.

As shown in FIG. 5, in step 502, the Tx UE may receive resource allocation information indicating at least one set of resources. Each set of resources is associated with a TB of a set of TBs to be transmitted on SL. Each set of resources may include: a plurality of SL transmission resources, each SL transmission resource being configured to carry an SL transmission of the TB; a plurality of SL feedback resources, each SL feedback resource being configured to carry SL feedback information in response to the SL transmission of the TB; and a plurality of UL feedback resources, at least one of the plurality of UL feedback resources being configured to carry UL feedback information in response to the SL transmission of the TB only in the case that the SL feedback information represents that the TB has been successfully decoded. The resource allocation information may indicate one set of resources for one TB to be transmitted on SL. Alternatively, the resource allocation information may indicate a plurality of sets of resources for the set of TBs to be transmitted on SL in some other embodiments of the present disclosure.

After successfully decoding the resource allocation information, the Tx UE may transmit the TB(s) based on the resource allocation information in step 504.

In some embodiments of the present disclosure, the Tx UE may transmit ACK information confirming receipt of the resource allocation information to the base station, which will help the base station determine whether a retransmission of the resource allocation information is needed.

Figure 6:
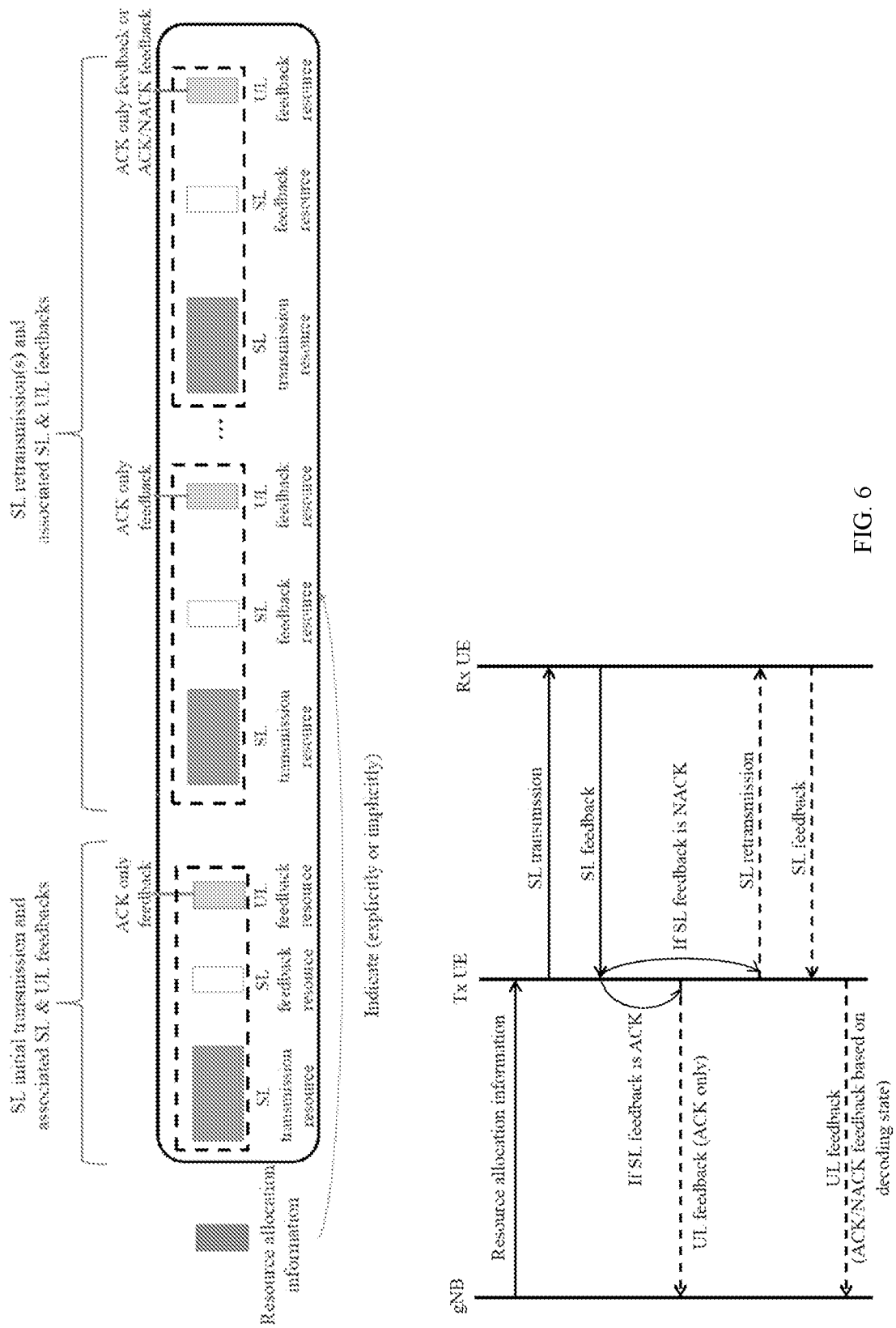
FIG. 6 is a schematic diagram illustrating a resource allocation scheme according to an embodiment of the present disclosure.

FIG. 6 is a schematic diagram illustrating a resource allocation scheme according to an embodiment of the present disclosure. Similar to the scheme illustrated in FIG. 3, the base station may schedule a set of resources for one initial SL transmission, one or more SL retransmissions, one or more SL feedback information transmissions associated with the SL transmission and SL retransmission(s), and more than one UL feedback information transmissions for a TB in this scheme.

As shown in FIG. 6, the base station (e.g., gNB) may transmit a piece of resource allocation information to the Tx UE. In some embodiments of the present disclosure, the resource allocation information may be carried by physical layer DCI. In other embodiments, the resource allocation information may be carried by higher-layer signalling from the base station, for example, RRC signalling. The resource allocation information indicates a set of resources for the TB, to the Tx UE. The TB is a block of data or packet of data to be transmitted, for example by the Tx UE. The set of resources may include a plurality of subsets of resources (each subset is surrounded by a dashed box in FIG. 6). Each subset of resources may include one SL transmission resource, one associated SL feedback resource, and one associated UL feedback resource. The first subset of resources among the plurality of subsets of resources may be configured for the SL initial transmission of the TB, and the other subset(s) of resources may be configured for the SL retransmission of the same TB.

The SL transmission resource in each subset of resources indicated by the resource allocation information is configured to carry an SL transmission (SL initial transmission or an SL retransmission) of the TB.

The SL feedback resource in each subset of resources is configured to carry SL feedback information in response to the associated SL transmission of the TB. According to an embodiment of the present disclosure, the SL feedback resource may be explicitly indicated in the resource allocation information, for example by indicating the location of the SL feedback resource in the time domain. According to another embodiment of the present disclosure, the SL feedback resource may be implicitly indicated. For example, although the location of the SL feedback resource in the time domain is not explicitly indicated in the resource allocation information, an association (e.g., relative location) between the SL transmission resource and its associated SL feedback resource in the time domain is predefined by the base station or based on the resource pool configuration The UL feedback resource in each subset of resources is configured to carry UL feedback information in response to the SL transmission of the TB. Different from the UL feedback resources in the schemes illustrated in FIGS. 3-5, the UL feedback resources in this scheme may be configured to carry UL feedback information only in the case that the associated SL feedback information represents that the TB has been successfully decoded. In other words, the UL feedback resources are configured to only carry an ACK feedback (i.e., the UL feedback information is an ACK only feedback). In an alternative embodiment of the present disclosure, only the UL feedback resource of the last subset of resources indicated by the resource allocation information is configured to carry an ACK or NACK feedback (ACK/NACK feedback) in response to a last SL transmission of the TB, and all the other UL feedback resources are configured to only carry an ACK feedback.

According to an embodiment of the present disclosure, the UL feedback resource may be explicitly indicated in the resource allocation information, for example by indicating the location of the UL feedback resource in the time domain. According to another embodiment of the present disclosure, the UL feedback resource may be implicitly indicated. For example, although the location of the UL feedback resource in the time domain is not explicitly indicated in the resource allocation information, an association (e.g., relative location) between the SL transmission resource and its associated UL feedback resource or an association (e.g., relative location) between the SL feedback resource and its associated UL feedback resource in the time domain is predefined by the base station or based on the resource pool configuration.

According to the scheme illustrated in FIG. 6, after receiving the resource allocation information from the base station, the Tx UE may transmit the TB based on the resource allocation information. According to an embodiment of the present disclosure, the Tx UE may transmit the TB to an Rx UE on the SL transmission resource of the first subset of resources indicated by the resource allocation information. Then the Rx UE may transmit SL feedback information on the associated SL feedback resource indicated (explicitly or implicitly) by the resource allocation information or by the Tx UE, based on the decoding state of the TB. For example, in the case that the Rx UE has successfully decoded the TB, it may transmit an ACK feedback to the Tx UE on the associated SL feedback resource. In the case that the Rx UE did not successfully decode the TB, it may transmit an NACK feedback to the Tx UE on the associated SL feedback resource. The ACK feedback and the NACK feedback may be transmit on an SL feedback channel, for example, PSFCH. In an embodiment of the present disclosure, the SL feedback information from the Rx UE may use one bit with a value "1" or "0" to represent that the TB has been successfully decoded or not respectively. For example, the value "1" may represent the ACK feedback in response to the SL transmission of the TB, and value "0" may represent the NACK feedback in response to the SL transmission of the TB. Alternatively, the value "0" may represent the ACK feedback in response to the SL transmission of the TB, and the value "1" may represent the NACK feedback in response to the SL transmission of the TB.

For the TB transmitted on the SL transmission resource, the Tx UE may monitor the associated SL feedback resource indicated (explicitly or implicitly) by the resource allocation information to detect the SL feedback information in response to the SL transmission of the TB. According to an embodiment of the present disclosure, in the case that the Tx UE detects an ACK feedback on the associated SL feedback resource, it may transmit an ACK feedback to the base station on the associated UL feedback resource. The Tx UE will determine that the SL transmission of the TB is successful and no retransmission of this TB is needed. Accordingly, the Tx UE will not use the remaining SL transmission resource(s) and associated SL and UL feedback resource(s) indicated for the TB. In the case that the Tx UE detects an NACK feedback on the associated SL feedback resource, it does not transmit any feedback to the base station, but retransmit the TB on the SL transmission resource(s) of the subsequent subset(s) of resources indicated by the resource allocation information, until it detects an ACK feedback on an SL feedback resource or all the SL transmission resources indicated by the resource allocation information have been used. In an alternative embodiment of the present disclosure, the Tx UE may transmit an NACK feedback on the UL feedback resource of the last subset of resources indicated by the resource allocation information in response to an NACK feedback being detected on the SL feedback resource of the last subset of resources.

In some embodiments of the present disclosure, the SL feedback information may be an ACK only feedback. That is, the Rx UE may only transmit an ACK feedback on the SL feedback resource in response to a transmission of the TB. In this case, the Tx UE may retransmit the TB on the SL transmission resource of the next subset of resources indicated by the resource allocation information in response to no ACK feedback being detected on an SL feedback resource. No ACK feedback being detected on an SL feedback resource may represent the TB not being successfully decoded or a discontinuous transmission (DTX) of the Rx UE. DTX of the Rx UE means that the Rx UE fails to decode sidelink control information on the sidelink control channel (e.g., physical sidelink control channel (PSCCH)) indicating the TB to the Rx UE so that the Rx UE does not transmit feedback information on the feedback channel (e.g., PSFCH).

In the scheme illustrated in FIG. 6, according to an embodiment of the present disclosure, in response to an ACK feedback in response to the SL transmission of the TB being detected on a UL feedback resource, the base station may determine that the SL transmission of the TB is successful and no retransmission of this TB is needed. Accordingly, the base station can release the unused SL transmission resource(s) and SL and UL feedback resource(s) in the indicated set of resources such that they can be allocated for another TB. In the case that all the UL feedback resources are configured to only carry an ACK feedback, the base station may indicate another set of resources for SL transmission of the TB in response to ACK feedback not being detected on all the UL feedback resources. In the case that the UL feedback resource of the last subset of resources indicated by the resource allocation information is configured to carry an ACK or NACK feedback, the base station may indicate another set of resources for SL transmission of the TB in response to detecting the NACK feedback on the last UL feedback resource in the indicated set of resources.

In FIG. 6, the number of the SL transmission resources, the number of the SL feedback resources, and the number of the UL feedback resources indicated in the resource allocation information are the same. According to an alternative embodiment of the present disclosure, the number of the SL transmission resources, the number of the SL feedback resources, and the number of the UL feedback resources indicated in the resource allocation information may be different from one another. For example, the resource allocation information may indicate M SL transmission resources, N SL feedback resources, and Q UL feedback resources for the TB, wherein M, N, and Q are integers, and M≥N≥Q≥1. That is, the resource allocation information may schedule M times of SL transmissions for the TB, schedule N times of SL feedback transmissions for the M times of SL transmissions, and schedule Q times of UL feedback transmissions for the N times of SL feedback transmissions (i.e., every i times of SL transmissions may have one SL feedback, every j times of SL transmissions may have one UL feedback, and every k times of SL feedbacks may have one UL feedback, wherein i=roundup (M/N), j=roundup (M/Q), k=roundup (N/Q), and the function "roundup (x)" means rounding up x to a nearest integer). The values of i, j, k, M, N, and Q may be determined based on reliability or delay requirement of the traffic.

According to the scheme illustrated in FIG. 6, since NACK feedback is not used on the UL feedback resources (except the last UL feedback resource in some cases), the code domain feedback indicator corresponding to the NACK feedback can be used for other UE whose feedback is indicated on the same UL feedback resources, and thus the base station may support UL feedbacks from more UEs on the same UL feedback resources.

Figure 7:
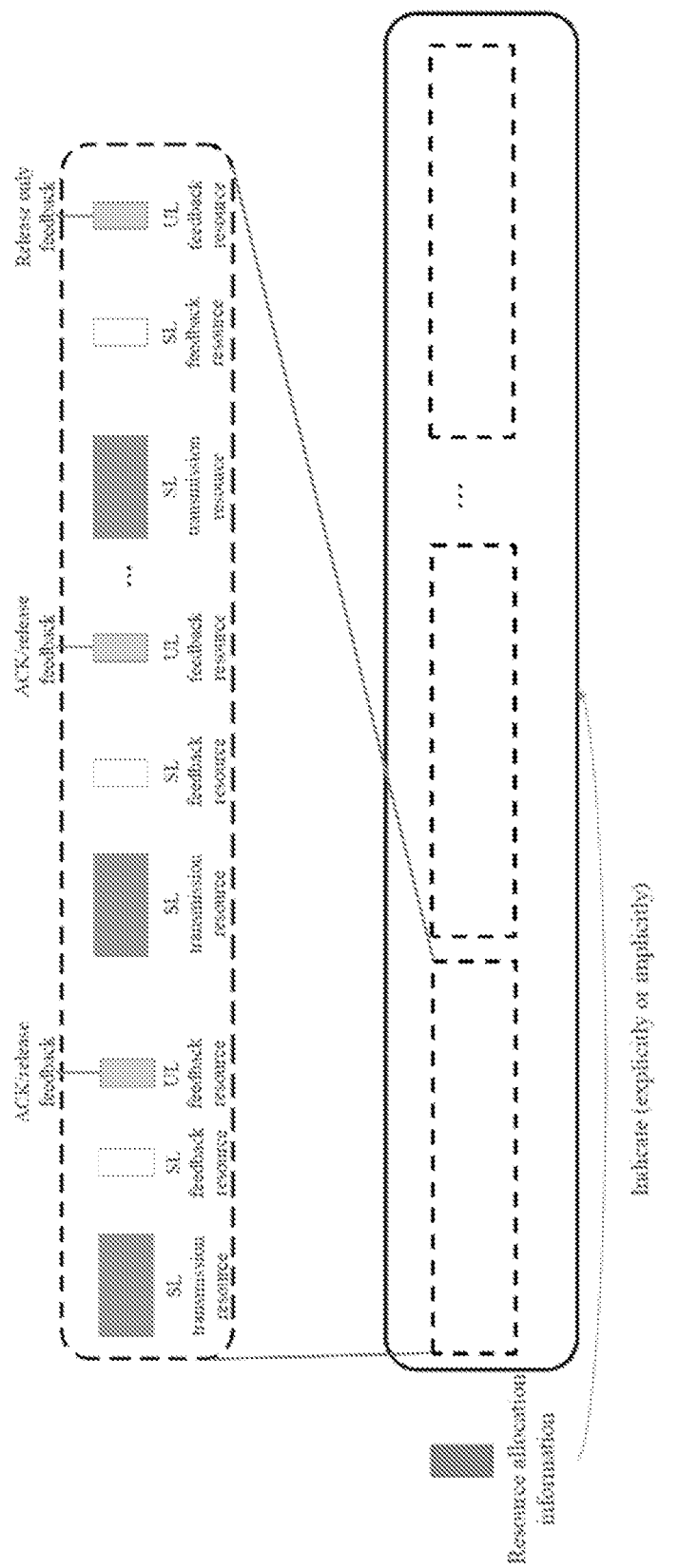
FIG. 7 is a schematic diagram illustrating a resource allocation scheme for semi-persistently scheduled SL transmissions according to an embodiment of the present disclosure.

FIG. 7 is a schematic diagram illustrating a resource allocation scheme for semi-persistently scheduled SL transmissions according to an embodiment of the present disclosure.

As shown in FIG. 7, the base station (e.g., gNB) may transmit a piece of resource allocation information to the Tx UE to indicate a plurality of sets of resources (each set is represent by a dashed box in FIG. 7) for a set of TBs to be transmitted on SL. In some embodiments, the resource allocation information may be carried by higher-layer signalling, for example, RRC signalling, and the semi-persistently scheduled SL transmissions may be activated or deactivated by physical layer DCI.

Each set of resources indicated by the resource allocation information is associated with one TB in the set of TBs, and may be similar to the set of resources illustrated in FIG. 6. That is, each set of resources may include a plurality of SL transmission resources, a plurality of SL feedback resources, and a plurality of UL feedback resources, wherein each SL transmission resource is configured to carry an SL transmission of the TB, each SL feedback resource is configured to carry SL feedback information in response to the SL transmission of the TB, and at least one of the plurality of UL feedback resources is configured to carry UL feedback information in response to the SL transmission of the TB only in the case that the SL feedback information represents that the TB has been successfully decoded. Similar to the scheme illustrated in FIG. 6, the number of the SL transmission resources, the number of the SL feedback resources, and the number of the UL feedback resources in a set of resources indicated by the resource allocation information may be the same or different in the scheme illustrated in FIG. 7.

In an embodiment of the present disclosure, the UL feedback information carried by the at least one of the plurality of UL feedback resources may be an ACK or release feedback, which may be a one-bit indicator with a value "1" or "0." For example, the value "1" may represent an ACK feedback in response to the SL transmission of the TB, and value "0" may represent a release indicator. Alternatively, the value "0" may represent the ACK feedback in response to the SL transmission of the TB, and the value "1" may represent the release indicator. In another embodiment of the present disclosure, the plurality of UL feedback resources in a set of resources indicated by the resource allocation information may further include a last UL feedback resource, which is configured to only carry a release feedback in response to a last SL transmission of the TB associated with the set of resources, wherein the release feedback may be a release indicator.

According to the scheme illustrated in FIG. 7, after receiving the resource allocation information from the base station, the Tx UE may transmit the TB based on the resource allocation information. Then the Rx UE may transmit SL feedback information on the associated SL feedback resource indicated (explicitly or implicitly) by the resource allocation information or by the Tx UE, based on the decoding state of the TB. For example, in the case that the Rx UE has successfully decoded the TB, it may transmit an ACK feedback to the Tx UE on the associated SL feedback resource. In the case that the Rx UE did not successfully decode the TB, it may transmit an NACK feedback to the Tx UE on the associated SL feedback resource. The ACK feedback and the NACK feedback may be transmit on an SL feedback channel, for example, PSFCH. In an embodiment of the present disclosure, the SL feedback information from the Rx UE may use one bit with a value "1" or "0" to represent that the TB has been successfully decoded or not respectively. For example, the value "1" may represent the ACK feedback in response to the SL transmission of the TB, and value "0" may represent the NACK feedback in response to the SL transmission of the TB. Alternatively, the value "0" may represent the ACK feedback in response to the SL transmission of the TB, and the value "1" may represent the NACK feedback in response to the SL transmission of the TB.

For the TB transmitted on the SL transmission resource, the Tx UE may monitor the associated SL feedback resource indicated (explicitly or implicitly) by the resource allocation information to detect the SL feedback information in response to the SL transmission of the TB. According to an embodiment of the present disclosure, in the case that the Tx UE detects an NACK feedback on the associated SL feedback resource, it does not transmit any feedback to the base station, but retransmit the TB on the subsequent SL transmission resource(s) indicated by the resource allocation information, until it detects an ACK feedback on an SL feedback resource or all the SL transmission resources indicated by the resource allocation information have been used. In the case that the Tx UE detects an ACK feedback on the SL feedback resource associated with a current transmission of the TB, it may determine that the SL transmission of the TB is successful and no retransmission of this TB is needed. Accordingly, the Tx UE will not use the remaining SL transmission resource(s) and associated SL and UL feedback resource(s) in the current set of resources. The Tx UE may further determine whether there is another TB to be transmitted on SL. If there is another TB to be transmitted on SL, the Tx UE may transmit the ACK feedback on the UL feedback resource associated with the current transmission of the TB. The Tx UE may further transmit the next TB in the set of TBs on the SL transmission resource of the next set of resources. If there is no TB to be transmitted on SL, the Tx UE may transmit the release feedback on the associated UL feedback resource. The Tx UE may determine that all the TBs in the set of the TBs have been successfully transmitted and no transmission/feedback resource is needed for these TBs. Accordingly, the Tx UE will not use the remaining resources indicated by the resource allocation information indicated for the set of TBs.

In some embodiments of the present disclosure, the SL feedback information may be an ACK only feedback. That is, the Rx UE may only transmit an ACK feedback on the SL feedback resource in response to a transmission of the TB. In this case, the Tx UE may retransmit the TB on the SL transmission resource of the next subset of resources indicated by the resource allocation information in response to no ACK feedback being detected on an SL feedback resource. No ACK feedback being detected on an SL feedback resource may represent the TB not being successfully decoded or a DTX of the Rx UE. DTX of the Rx UE means that the Rx UE fails to decode sidelink control information on the sidelink control channel (e.g., PSCCH) indicating the TB to the Rx UE so that the Rx UE does not transmit feedback information on the feedback channel (e.g., PSFCH).

In the scheme illustrated in FIG. 7, according to an embodiment of the present disclosure, in response to an ACK feedback in response to the SL transmission of the TB being detected on a UL feedback resource in a current set of resources of the plurality of sets or resources indicated by the resource allocation information, the base station may determine that the SL transmission of the TB is successful and no retransmission of this TB is needed. Accordingly, the base station can release the unused SL transmission resource(s) and SL and UL feedback resource(s) in the current set of resources such that they can be allocated to another TB. The base station may stop monitoring unused UL feedback resource(s) in the current set of resources. In response to a release feedback on a UL feedback resource in a current set of resources of the plurality of sets or resources indicated by the resource allocation information, the base station may determine that all the TBs in the set of TBs have been successfully transmitted and no transmission/feedback resource is needed for these TBs. Accordingly, the base station can release all the unused SL transmission resource(s) and SL and UL feedback resource(s) in the plurality of sets of resources such that they can be allocated to another TB. The base station may stop monitoring all the unused UL feedback resource(s) in the plurality of sets of resources.

In the schemes illustrated in FIGS. 6 and 7, after receiving the resource allocation information, the Tx UE may transmit an ACK information confirming receipt of the resource allocation information to the base station, which will help the base station determine whether a retransmission of the resource allocation information is needed.

In an embodiment of the present disclosure, the ACK information confirming receipt of the resource allocation information may be an independent UL ACK transmission from the Tx UE on a physical UL control channel (PUCCH). The PUCCH resource carrying the ACK information may have a fixed (e.g., predefined) offset in time domain with respect to the resource carrying the resource allocation information. In the case that the base station receives the ACK information from the Tx UE on the expected resource, the base station will not reallocate the set of resources indicated by the resource allocation information to other UEs. In the case that the base station does not receive the ACK information from the Tx UE on the expected resource, the base station will transmit another piece of resource allocation information to the Tx UE.

In another embodiment of the present disclosure, the first UL ACK feedback on a UL feedback resource in the set(s) of resources indicated by the resource allocation information may act as the ACK information confirming receipt of the resource allocation information.

Figure 8:
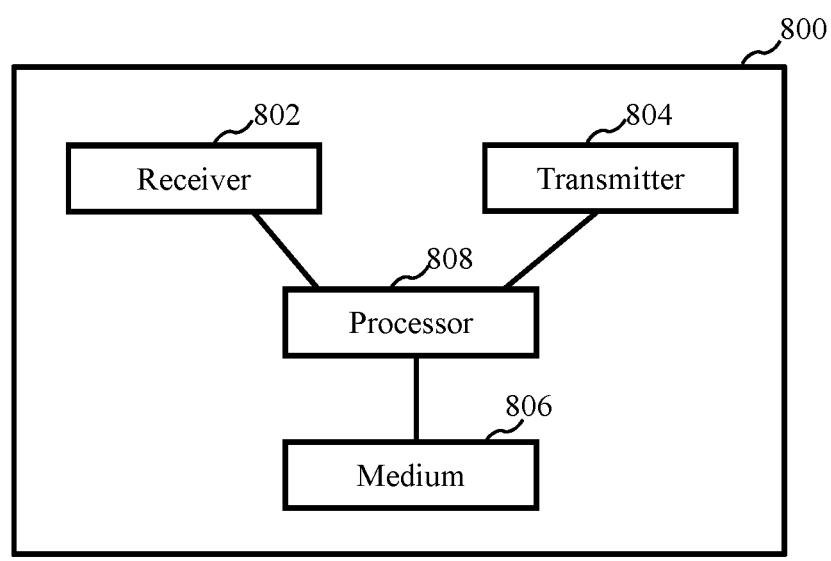
FIG. 8 illustrates an exemplary block diagram of an apparatus according to an embodiment of the present disclosure.

FIG. 8 illustrates an exemplary block diagram of an apparatus 800 according to an embodiment of the present disclosure. In some embodiments of the present disclosure, the apparatus 800 may be a base station (e.g., gNB), which can at least perform the method illustrated in FIG. 4.

As shown in FIG. 8, the apparatus 800 may include a receiver 802, a transmitter 804, a non-transitory computer-readable medium 806, and a processor 808 coupled to the receiver 802, the transmitter 804, and the non-transitory computer-readable medium 806.

Although in FIG. 8, elements such as receiver 802, transmitter 804, non-transitory computer-readable medium 806, and processor 808 are described in the singular, the plural is contemplated unless limitation to the singular is explicitly stated. In some embodiments of the present disclosure, the receiver 802 and the transmitter 804 are combined into a single device, such as a transceiver. In certain embodiments of the present disclosure, the apparatus 800 may further include an input device, a memory, and/or other components.

In some embodiments of the present disclosure, the non-transitory computer-readable medium 806 may have stored thereon computer-executable instructions which are programmed to implement the steps of the methods, for example as described in view of FIG. 4, with the receiver 802, the transmitter 804, and the processor 808.

Figure 9:
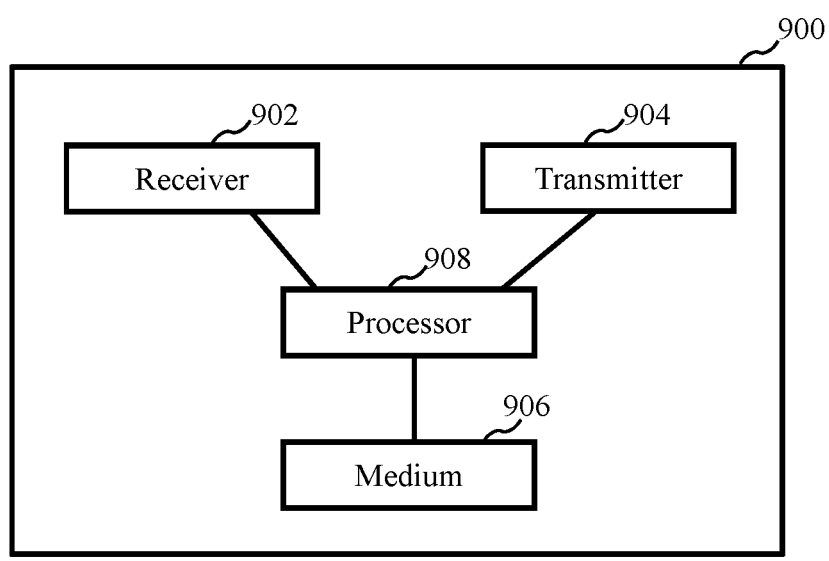
FIG. 9 illustrates an exemplary block diagram of an apparatus according to another embodiment of the present disclosure.

FIG. 9 illustrates an exemplary block diagram of an apparatus 900 according to another embodiment of the present disclosure. In some embodiments of the present disclosure, the apparatus 900 may be a UE (e.g., Tx UE), which can at least perform the method illustrated in FIG. 5.

As shown in FIG. 9, the apparatus 900 may include a receiver 902, a transmitter 904, a non-transitory computer-readable medium 906, and a processor 908 coupled to the receiver 902, the transmitter 904, and the non-transitory computer-readable medium 906.

Although in FIG. 9, elements such as receiver 902, transmitter 904, non-transitory computer-readable medium 906, and processor 908 are described in the singular, the plural is contemplated unless limitation to the singular is explicitly stated. In some embodiments of the present disclosure, the receiver 902 and the transmitter 904 are combined into a single device, such as a transceiver. In certain embodiments of the present disclosure, the apparatus 900 may further include an input device, a memory, and/or other components.

In some embodiments of the present disclosure, the non-transitory computer-readable medium 906 may have stored thereon computer-executable instructions which are programmed to implement the steps of the methods, for example as described in view of FIG. 5, with the receiver 902, the transmitter 904, and the processor 908.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a base station, the method comprising:
   determining resource allocation information indicating at least one set of resources, wherein each set of resources is associated with a transport block of a set of transport blocks to be transmitted on sidelink, wherein:
   each set of resources comprises:
      a subset of transmission resources, the subset of transmission resources comprising:
         at least one sidelink transmission resource, each sidelink transmission resource being configured to carry a sidelink transmission of the transport block;
         at least one sidelink feedback resource, each sidelink feedback resource being configured to carry sidelink feedback information in response to the sidelink transmission of the transport block; and
         at least one uplink feedback resource configured to carry uplink feedback information in response to the sidelink transmission of the transport block only if the sidelink feedback information represents that the transport block has been successfully decoded; and
      a plurality of subsets of retransmission resources, each subset of retransmission resources comprising:
         at least one sidelink retransmission resource, each sidelink retransmission resource being configured to carry a sidelink retransmission of the transport block;
         at least one sidelink retransmission feedback resource, each sidelink retransmission feedback resource being configured to carry sidelink retransmission feedback information in response to the sidelink retransmission of the transport block; and
         at least one uplink retransmission feedback resource configured to carry uplink feedback information in response to the sidelink retransmission of the transport block if the sidelink retransmission feedback information represents that the transport block has been successfully decoded; and
   transmitting the determined resource allocation information, wherein transmitting the determined resource allocation information comprises indicating each resource of the at least one set of resources prior to the sidelink transmission of the transport block.

2. The method of claim 1, wherein the resource allocation information indicates one set of resources for one transport block to be transmitted on sidelink.

3. The method of claim 2, wherein the resource allocation information is carried by physical layer downlink control information or radio resource control signalling.

4. The method of claim 2, wherein the at least one uplink feedback resource is configured to only carry an acknowledgement feedback.

5. The method of claim 4, further comprising determining and transmitting another piece of resource allocation information for transmission of the transport block on sidelink in response to acknowledgement feedback not being detected on the at least one uplink feedback resource.

6. The method of claim 2, wherein the plurality of subsets of retransmission resources further comprises a last one uplink feedback resource which is configured to carry an acknowledgement or non-acknowledgement feedback in response to a last sidelink retransmission of the transport block.

7. The method of claim 6, further comprising determining and transmitting another piece of resource allocation information for transmission of the transport block on sidelink in response to a non-acknowledgement feedback being detected on the last one uplink feedback resource.

8. The method of claim 1, wherein the resource allocation information indicates M sidelink transmission resources, N sidelink feedback resources, and Q uplink feedback resources for the transport block, wherein M, N, and Q are integers, and $M \geq N \geq Q \geq 1$.

9. The method of claim 1, wherein the transmissions on the sidelink are semi-persistently scheduled, and the resource allocation information indicates a plurality of sets of resources for the set of transport blocks to be transmitted on sidelink.

10. The method of claim 9, wherein the resource allocation information is carried by radio resource control signalling.

11. The method of claim 9, wherein the at least one of the at least one uplink feedback resource and the at least one uplink retransmission feedback resource is configured to carry an acknowledgement or release feedback.

12. A user equipment (UE), comprising:
    at least one memory; and
    at least one processor coupled with the at least one memory and configured to cause the UE to:
        receive resource allocation information indicating at least one set of resources, wherein receiving the resource allocation information comprises receiving an indication of each resource of the at least one set of resources prior to a sidelink transmission of a transport block, each set of resources is associated with a transport block of a set of transport blocks to be transmitted on sidelink, and each set of resources comprises:
            a subset of transmission resources, the subset of transmission resources comprising:
                at least one sidelink transmission resource, each sidelink transmission resource being configured to carry a sidelink transmission of the transport block;
                at least one sidelink feedback resource, each sidelink feedback resource being configured to carry sidelink feedback information in response to the sidelink transmission of the transport block; and
                at least one uplink feedback resource configured to carry uplink feedback information in response to the sidelink transmission of the transport block only if the sidelink feedback information represents that the transport block has been successfully decoded; and a plurality of subsets of retransmission resources, each subset of retransmission resources comprising:
- at least one sidelink retransmission resource, each sidelink retransmission resource being configured to carry a sidelink retransmission of the transport block;
- at least one sidelink retransmission feedback resource, each sidelink retransmission feedback resource being configured to carry sidelink retransmission feedback information in response to the sidelink retransmission of the transport block; and
- at least one uplink retransmission feedback resource configured to carry uplink feedback information in response to the sidelink retransmission of the transport block if the sidelink retransmission feedback information represents that the transport block has been successfully decoded; and transmit the transport blocks based on the resource allocation information.

13. The UE of claim 12, wherein the resource allocation information indicates one set of resources for one transport block to be transmitted on sidelink.

14. The UE of claim 13, wherein the at least one uplink feedback resource is configured to only carry an acknowledgement feedback.

15. The UE of claim 14, wherein the at least one processor is further configured to cause the UE to transmit the acknowledgement feedback in response to detecting an acknowledgement sidelink feedback.

16. The UE of claim 14, wherein the at least one processor is further configured to cause the UE to retransmit the transport block on the at least one sidelink retransmission resource in response to no acknowledgement sidelink feedback being detected on the at least one sidelink feedback resource.

17. The UE of claim 13, wherein the plurality of subsets of retransmission resources further comprises a last one uplink feedback resource which is configured to carry an acknowledgement or non-acknowledgement feedback in response to a last sidelink retransmission of the transport block.

18. The UE of claim 12, wherein the at least one processor is further configured to cause the UE to receive another piece of resource allocation information for sidelink transmission of the transport block.

19. The UE of claim 12, wherein the resource allocation information indicates M sidelink transmission resources, N sidelink feedback resources, and Q uplink feedback resources for the transport block, wherein M, N, and Q are integers, and $M \geq N \geq Q \geq 1$.

20. A base station, comprising:
at least one memory; and
at least one processor coupled with the at least one memory and configured to cause the base station to:
determine resource allocation information indicating at least one set of resources, wherein each set of resources is associated with a transport block of a set of transport blocks to be transmitted on sidelink, wherein each set of resources comprises:
a subset of transmission resources, the subset of transmission resources comprising:
- at least one sidelink transmission resource, each sidelink transmission resource being configured to carry a sidelink transmission of the transport block;
- at least one sidelink feedback resource, each sidelink feedback resource being configured to carry sidelink feedback information in response to the sidelink transmission of the transport block; and
- at least one uplink feedback resource configured to carry uplink feedback information in response to the sidelink transmission of the transport block only if the sidelink feedback information represents that the transport block has been successfully decoded; and a plurality of subsets of retransmission resources, each subset of retransmission resources comprising:
- at least one sidelink retransmission resource, each sidelink retransmission resource being configured to carry a sidelink retransmission of the transport block;
- at least one sidelink retransmission feedback resource, each sidelink retransmission feedback resource being configured to carry sidelink retransmission feedback information in response to the sidelink retransmission of the transport block; and
- at least one uplink retransmission feedback resource configured to carry uplink feedback information in response to the sidelink retransmission of the transport block if the sidelink retransmission feedback information represents that the transport block has been successfully decoded; and transmit the determined resource allocation information by indicating each resource of the at least one set of resources prior to the sidelink transmission of the transport block.

\* \* \* \* \*